United States Patent [19]

Barbee

[11] Patent Number: 4,671,247
[45] Date of Patent: Jun. 9, 1987

[54] FUEL ATOMIZING APPARATUS FOR INTERNAL COMBUSTION ENGINES

[76] Inventor: William E. Barbee, 104 E. Sunset Dr., Locust, N.C. 28097

[21] Appl. No.: 833,821

[22] Filed: Feb. 26, 1986

[51] Int. Cl.[4] .......................................... F02M 29/00
[52] U.S. Cl. .................................. 123/592; 123/568; 48/189
[58] Field of Search ............... 123/592, 568; 48/189.3, 48/189.5

[56] References Cited

U.S. PATENT DOCUMENTS

| | | | |
|---|---|---|---|
| 1,498,859 | 6/1924 | Wekerle | 123/592 |
| 2,093,918 | 9/1937 | Lord | 123/592 |
| 2,216,722 | 10/1940 | Denson | 123/592 |
| 3,437,467 | 4/1969 | Jacobus | 48/189.3 |
| 3,615,296 | 10/1971 | Guarnaschelli | 123/592 |
| 4,011,850 | 3/1977 | Knox, Sr. | 123/592 |
| 4,014,303 | 3/1977 | Aiti | 123/592 |
| 4,367,700 | 1/1983 | Pace | 123/592 |
| 4,399,800 | 8/1983 | Weindelmayer | 123/592 |
| 4,478,607 | 10/1984 | Capps | 123/592 |
| 4,569,322 | 2/1986 | Gristina | 123/568 |

Primary Examiner—E. Rollins Cross
Attorney, Agent, or Firm—Shefte, Pinckney & Sawyer

[57] ABSTRACT

An apparatus for enhancing fuel atomization in an internal combustion engine includes an impeller assembly mounted between the carburetor and intake manifold of the engine with a rotational rotor for impingement by the moving fuel entrained airstream from the carburetor and the intake manifold to rotationally disperse and further atomize the fuel particles in the airstream. An E.G.R. valve operated by the vacuum draw from the engine controls the admission of a supplemental airstream into the impeller assembly radially against the rotor member at engine speeds in excess of a predetermined threshold level to impart increased rotational speed to the rotor member to further enhance fuel atomization and to achieve a turbocharging-like effect.

12 Claims, 3 Drawing Figures

FUEL ATOMIZING APPARATUS FOR INTERNAL COMBUSTION ENGINES

BACKGROUND OF THE INVENTION

The present invention relates to internal combustion engines and particularly to apparatus for preparing a mixture of atomized liquid fuel and air for combustion in such engines.

With the significant increases in recent years in the prices of gasoline and other liquid fuels commonly used in internal combustion engines, considerable interest in and a considerable need for improved fuel efficiency in the operation of internal combustion engines has developed. In basic theory of operation, internal combustion engines rely on a mixture of atomized liquid fuel and air capable of substantially complete and instantaneous combustion in the combustion chambers of such engines for proper operation thereof. Traditionally, one or more carburetors have been utilized for this purpose. However, one of the drawbacks of the use of carburetors is that their ability to atomize liquid fuel into a very fine mist capable of substantially complete and instantaneous combustion is limited. Specifically, carburetors typically produce fuel particles which are too large for complete and instantaneous combustion in internal combustion engines, resulting in unnecessarily high fuel consumption, less than optimal resultant power from the fuel combustion, and unnecessarily high levels of atmospheric pollutants in the products of combustion.

Accordingly, a significant need exists for an apparatus or means for use in an internal combustion engine for improving the degree of fine atomization of the liquid fuel utilized. One particular arrangement that has been attempted in the past is to provide a rotatable or non-rotatable propeller disposed intermediate the carburetor and intake manifold of an internal combustion engine for the intended purpose of improving the atomization of the fuel particles in the fuel-and-air mixture prepared by the carburetor. Representative examples of varying devices and arrangements of this basic type are disclosed in U.S. Pat. Nos. 1,498,859; 2,216,722; 2,354,373; 4,011,850; 4,014,303; 4,367,700; and 4,478,607. Despite the degree of attention that propeller devices of this type have received in the past as represented by these patents, it is believed that none of these devices or apparatus have ever been commercially produced or proved commercially feasible, principally it is believed because these devices do not provide any direct relationship between their operation and the fuel requirements of the engine during the course of its operation.

It is therefore an object of the present invention to provide an improved propeller-type fuel atomization apparatus for use in internal combustion engines which is operated by a particular control arrangement in relation to the fuel requirements of the engine as its speed increases and decreases during the course of normal engine operation, thereby to provide improved completeness in the combustion of the fuel-air mixture with attendant improvement of the fuel economy, power output and pollutant output of the engine.

SUMMARY OF THE INVENTION

The improved fuel atomization apparatus of the present invention is most basically adapted for use in combination with an internal combustion engine of the type defining at least one combustion chamber and adapted to combust a fuel-and-air mixture in the combustion chamber and to exhaust the products of combustion therefrom to create a partial vacuum in the combustion chamber and draw a moving ambient airstream thereinto. Such engines include an arrangement for atomizing liquid fuel and entraining the atomized fuel in the moving airstream and an arrangement providing communication between the atomizing and entraining arrangement and the combustion chamber for directing the fuel entrained airstream to the combustion chamber. Briefly described, the present apparatus includes an impeller arrangement rotatably mounted intermediate the fuel atomizing and entraining arrangement and the airstream directing arrangement for impingement thereagainst by the fuel entrained airstream for rotationally dispersing the fuel entrained airstream to break up and further atomize the liquid fuel therein. An arrangement is provided for admitting and directing a supplemental ambient airstream against the impeller arrangement for imparting increased speed of rotation thereof. A diaphragm device is provided for sensing the force of the vacuum draw exerted by the engine on the atomizing and entraining arrangement, the diaphragm device being operably associated with the supplement air arrangement for maintaining the supplemental air arrangement closed when the vacuum draw force of the engine is less than a preselected value and opening the supplement air arrangement when the vacuum draw force of the engine is greater than the preselected value. In this manner, the fuel entrained airstream is conditioned by the impeller arrangement in relation to the fuel requirements of the engine for substantially complete burning of the atomized fuel with minimal pollutants in the resultant products of combustion.

The fuel atomizing apparatus of the present invention is preferably utilized in combination with a conventional automobile engine having a plurality of combustion chambers with a carburetor for aspirating liquid fuel in atomized particles and entraining the fuel particles in the vacuum-induced moving airstream for supply to the engine and an intake manifold for directing the fuel entrained airstream to the combustion chambers. The impeller arrangement includes a body mounted intermediate the carburetor and the intake manifold with a throat area through the body providing fluid communication between the carburetor and the intake manifold for passage through the throat area of the fuel entrained airstream. A rotor member is rotatably mounted in the throat area with its rotational axis substantially parallel to the direction of movement of the fuel entrained airstream for impingement against the rotor member by the fuel entrained airstream to disperse and further atomize the fuel particles therein into relatively fine particles adapted for substantially complete combustion in the engine. An inlet passageway is formed through the body and opens into the throat area radially to the rotational axis of the rotor. An air filter is provided on the engine carburetor with a conduit arrangement extending between the air filter and the inlet passageway of the impeller arrangement body for creating the supplemental ambient airstream and directing it into the inlet passageway of the body for radial impingement against the rotor member for imparting increased speed of rotation thereof. An E.G.R. diaphragm valve assembly is operably connected to the conduit arrangement for controlling the opening and closing thereof. The E.G.R. diaphragm valve assembly includes an inlet opening, an outlet opening and a vacuum sensitive diaphragm for opening and closing communication between the inlet and outlet openings. The inlet and outlet openings are operably connected to the conduit arrangement and the diaphragm is operatively connected with the carburetor for monitoring the force of the vacuum draw created by the engine thereon for closing and opening communication between the inlet and outlet openings respectively when the vacuum draw force is less than and greater than the preselected value. Preferably, the engine includes a spark ignition distributor and a vacuum advance assembly associated therewith for sensing the vacuum draw force of the engine on the carburetor, the E.G.R. diaphragm valve assembly communicating with the vacuum advance assembly for correspondingly sensing the vacuum draw force of the engine.

DESCRIPTION OF THE PREFERRED EMBODIMENT

Figure 1:
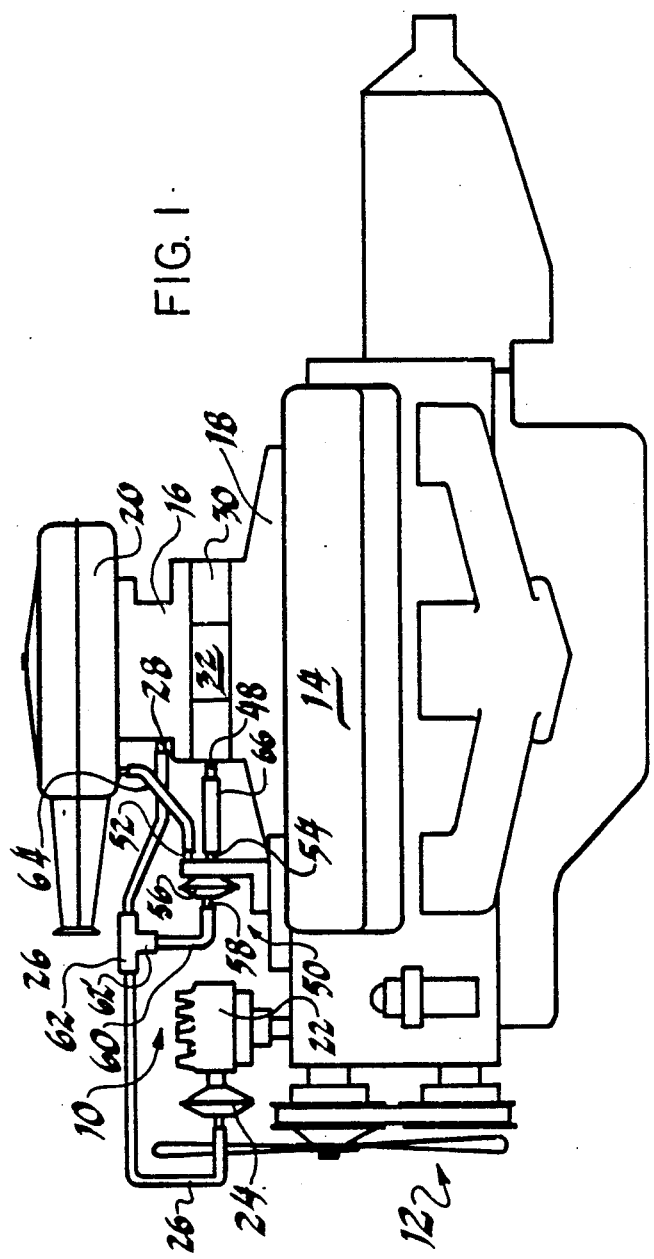
FIG. 1 is a schematic side elevational view of the improved fuel atomization apparatus of the present invention as preferably embodied in combination with a conventional internal combustion engine of the type utilized in automobiles.

Referring now to the accompanying drawings and initially to FIG. 1, the improved fuel atomization apparatus of the present invention is indicated generally at 10 as preferably embodied in combination with a conventional gasoline-powered internal combustion automobile engine which is only schematically illustrated generally at 12. The construction and operation of a typical automobile engine such as the engine 12 is well-known in the art and, therefore, will be described herein only insofar as is necessary to facilitate an understanding of the atomization apparatus 10.

The automobile engine 12 includes an engine block 14 in which a plurality of cylindrical chambers (not shown) are formed and each of which receives a reciprocable piston (also not shown). The engine block 14 and the pistons define a plurality of combustion chambers respectively within the cylindrical chambers for combustion therein of an appropriate fuel-and-air mixture and exhaustion therefrom of the products of such combustion through a suitable valve arrangement (also not shown) to effect powered reciprocation of the pistons. The engine 12 includes a carburetor, representatively indicated at 16, for atomizing liquid fuel pumped from a suitable fuel supply or reservoir (not shown) and an intake manifold, representatively indicated at 18, mounted on the engine block 12 with suitable internal manifold passageways (not shown) in respective communication with the inlet valve assemblies to the cylindrical chambers of the engine 12 and with the carburetor 16 mounted on the intake manifold 18 in fluid communication with its internal passageways for delivering the atomized fuel into the intake manifold 18 for direction into the engine's combustion chambers.

As will be understood, the combustion of the fuel-and-air mixture in the combustion chambers of the engine 12 and the exhaustion of the products of such combustion therefrom create a partial vacuum through the intake manifold 18 and the carburetor 16 to produce a suction drawing force creating a moving ambient airstream through the carburetor 16 and the intake manifold 18 into which the carburetor 16 aspirates the atomized fuel in particulate form to be entrained in the moving airstream, thereby constantly supplying an appropriate fuel-and-air mixture to the cylindrical chambers of the engine 12. An air cleaner assembly 20 is mounted over the carburetor 16 to filter airborne dust, debris and foreign matter from the ambient air being drawn through the carburetor 16 to prevent admission of any such debris or foreign matter into the combustion chambers of the engine 12. As with all gasoline-powered engines, the engine 12 includes a conventional distributor 22 to control the sequence of combustion ignition in the combustion chambers of the engine 12. A vacuum advance diaphragm 24 is mounted on the housing of the distributor 22 and communicates through a tubular conduit 26 with a nipple 28 on the carburetor 16 opening into the throat passageway through the carburetor 16, for continuously monitoring the force of the vacuum draw created by the engine 12 through the carburetor 16 and in turn controlling stepwise rotational reciprocation of the distributor 22 in relation to the vacuum draw force, all as is conventional.

Figure 2:
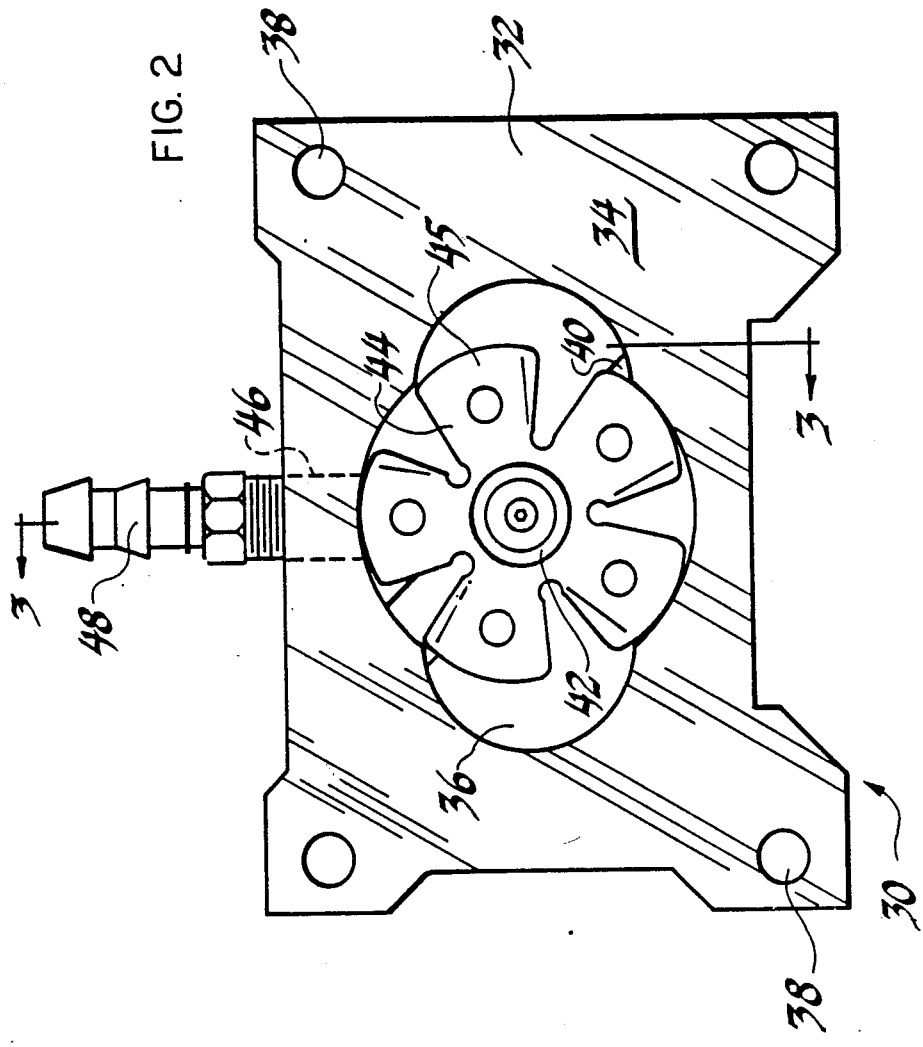
FIG. 2 is a top plan view of the impeller assembly of the fuel atomization apparatus of FIG. 1.
Figure 3:
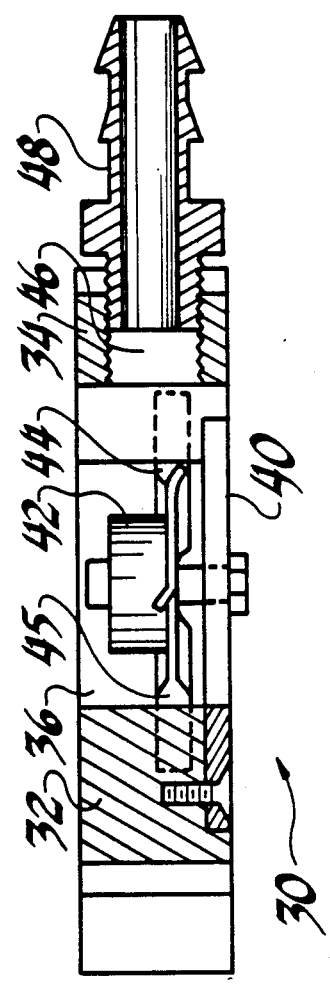
FIG. 3 is a horizontal cross-sectional view of the impeller assembly of FIG. 2 taken along line 3—3 thereof.

The atomizing apparatus 10 of the present invention includes an impeller assembly 30, best seen in FIGS. 2 and 3, mounted intermediate the carburetor 16 and the intake manifold 18. The impeller assembly 30 includes a body 32 of generally rectangular shape having opposed substantially flat, parallel top and bottom faces 34 with a central throat area 36 extending through the body 32 between the faces 34 and being of the same configuration and dimension as the respective throat areas of the carburetor 16 and the intake manifold 18. Four bores 38 are formed through the body 32 at its respective corners to facilitate bolted mounting of the body 32 between the carburetor 16 and the intake manifold 18 with the throat area 36 in aligned correspondence with the respective throat areas of the carburetor 16 and the intake manifold 18, utilizing the same bolted connection by which the carburetor 16 is conventionally mounted to the intake manifold 18. The body 32 is preferably formed of a suitable metal such as aluminum, or may be formed of a plastic material having suitably high temperature resistant properties. A flat bar 40 is affixed to the bottom face 34 of the body 32 to extend diagonally across the throat area 36 and centrally supports a bearing assembly 42 by which a propeller-type rotor member 44 is rotatably mounted within the throat area 36 about a rotational axis oriented essentially perpendicularly to the faces 34 and parallel to the direction of vacuum draw by the engine 12 through the throat area 36, as hereinafter more fully described. The blades 45 of the rotor member 44 are dimensioned to occupy substantially the entire transverse area of the throat area 36 of the body 32. A threaded bore 46 is formed through one side 35 of the impeller assembly body 32 to open laterally into the throat area 36 radially with respect to the rotor member 44, and a tubular nipple member 48 is threadedly fitted in and extends outwardly from the bore 46.

The atomizing apparatus 10 also includes a conventional E.G.R. diaphragm valve assembly 50 suitably mounted on the engine block 14, the intake manifold 18 or otherwise on or adjacent the engine 12. The E.G.R. valve assembly includes a fluid inlet port 52, a fluid outlet port 54, and a flexible vacuum-operated diaphragm member 56 operatively arranged to close and open fluid cmmunication between the inlet and outlet ports 52,54, respectively, when a vacuum or suction force of less than and greater than a preselected value is applied to the diaphragm member 56 through a tubular nipple 58 communicating therewith. The tubular nipple 58 of the diaphragm member 56 is arranged in fluid communication wth the tubular conduit 26 between the carburetor 16 and the vacuum advance diaphargm 24 by a tubular conduit 60 which extends between the tubular nipple 58 and the free connecting arm 62' of a conventional T-type tubular connecting member 62 fitted in line in the conduit 26, thereby to apply to the diaphragm member 56 of the E.G.R. valve assembly 50 the engine created vacuum draw force prevailing in the throat area of the carburetor 16. The inlet port 52 of the E.G.R. valve assembly 50 is fitted with a tubular conduit 64 which extends therefrom to the interior "clean" side of the air filter assembly 20 of the engine 12 and the outlet port 54 of the E.G.R. valve assembly 50 is fitted with a tubular conduit 66 which extends therefrom to and is fitted on the tubular nipple 48 of the impeller assembly 30, thereby to provide fluid communication between the clean side of the air filter assembly 20 and the throat area 36 of the impeller assembly 30 through the E.G.R. valve assembly 50.

The operation of the atomizing apparatus 10 will thus be understood. As is known, the force of the partial vacuum created in the combustion chambers of the engine 12 during operation and applied through the intake manifold 18, the impeller assembly 30 and the carburetor 16 varies in direct relation to the engine speed, i.e. its number of revolutions per minute. The preselected threshold vacuum force for controlling valve opening and closing operation of the diaphragm member 56 of the E.G.R. valve assembly 50 is chosen in relation to the minimum and maximum vacuum forces which the particular engine 12 is adapted to produce at its minimum and maximum operating speeds, respectively. Conventionally, E.G.R. valve assemblies of differing threshold operating vacuum ratings are available. Therefore, as will be understood, the threshold operating vacuum rating of the E.G.R. valve assembly 50 may vary according to the particular engine 12 and the particular desired operation of the atomizing apparatus 10. It has been found that the atomizing apparatus 10 operates advantageously when the E.G.R. valve assembly 50 has a threshold operating vacuum rating approximately equal to the engine-created vacuum draw force which prevails at a minimum so-called "cruising speed" of the automobile engine 12, e.g. the engine speed which prevails at 35 to 40 miles per hour operation of the automobile in its highest transmission gearing.

Thus, when the engine 12 is operating at "idling" speed and at all engine speeds less than its "cruising speed," the vacuum draw force applied by the engine 12 through the intake manifold 18, the impeller assembly 30 and the carburetor 16 will be insufficient to effect opening movement of the diaphragm member 56 of the E.G.R. valve assembly 50 to close communication between the inlet and outlet ports 52,54. At such engine speeds, the movement of the fuel entrained airstream from the carburetor 16 through the throat area 36 of the impeller assembly 30 impinges on the blades of the rotor member 44 to impart rotational movement thereto which in turn rotationally disperses the fuel entrained airstream to break up and further atomize the liquid fuel particles therein. At all engine speed at and in excess of the predetermined "cruising speed," the engine-created vacuum draw force prevailing within the throat area of the carburetor 16 is applied through the conduit 60 to the diaphragm member 56 of the E.G.R. valve assembly 50 to effect opening movement thereof to open fluid communication between the inlet and outlet ports 52,54. Accordingly, the vacuum draw force of the engine 12 then operates through the bore 46 in the impeller assembly body 32, the nipple 48, the tubular conduit 66, the E.G.R. valve assembly 50, and the tubular conduit 64 to create a supplemental moving stream of cleaned ambient air from the air filter 20, which supplemental airstream is directed upon emission from the bore 46 radially against the blades of the rotor member 44 to impart an increased speed of rotation to the rotor member 44. As a result, at such engine speeds in excess of the "cruising speed," the rotor member 44 is of a significantly greater effectiveness in dispersing the fuel entrained airstream flowing through the throat area 36 of the impeller assembly 30 to break up the fuel particles in the airstream into relatively fine particles in the nature of a mist so as to be adapted for substantially complete and instantaneous combustion of the fuel-and-air mixture within the combustion chambers of the engine 12.

Several important advantages accrue from this manner of operation of the atomizing apparatus 10. First and most importantly, the fine particulate form of the atomizing fuel particles produced by the dispersing and breaking effect of the rotating rotor member 44 promotes more instantaneous and complete combustion of the fuel-and-air mixture in the combustion chambers of the engine 12, as previously indicated, and in turn achieves a more economical consumption of the fuel with a greater power output from the fuel consumed and a reduction in the polluting products of combustion. The apparatus 10 furthermore is advantageously simple in construction and therefore may be economically manufactured and sold at relatively low cost, both as original equipment on new internal combustion engines as well as for retrofitting on existing engines. The vacuum-related control arrangement provided by the E.G.R. valve assembly 50 further enables the optimal benefit to be derived from the impeller assembly 30. As will be understood from the above description of the operation of the impeller assembly 30, the rotational effect of the rotor member 44 at speeds above the "cruising speed" of the engine 12 not only serves to improve the atomization of the fuel particles in the fuel entrained airstream but also effectively produces a turbocharging-like effect by the admission of the supplemental airstream and by effectively impelling the fuel entrained airstream into the intake manifold 18. As a result, the well-known effects of turbocharging in deriving increased power output without increased fuel consumption are obtained. It has been found, however, that the admission of the supplemental airstream for increasing the rotational speed of the rotor member 44 may produce a disadvantageously lean fuel-to-air ratio in the fuel entrained airstream when the engine is at its idling speed and other engine speeds below the "cruising speed". Accordingly, the threshold vacuum rating of the E.G.R. valve assembly 50 is selected to control the admission of the supplemental airstream to occur only at engine speeds at which the advantageous effects of the increased rotational speed of the rotor member 44 are achieved without risking possible fuel starvation of the engine. As mentioned, even at the engine's idling and other speeds below the "cruising speed," the movement of the fuel entrained airstream still acts to impart rotation to the rotor member 44 to achieve improved fuel atomization.

As will be understood, the atomizing apparatus 10 need not necessarily be utilized in conjunction with a conventional carburetor and intake manifold assembly but may equally well be adapted in conjunction with any mechanism or arrangement for atomizing the liquid fuel and entraining it in a moving airstream for delivery to an internal combustion engine. Similarly, the operating valve assembly for the atomizing apparatus 10 need not necessarily be an E.G.R. valve assembly and need not necessarily be operatively connected to a distributor-associated vacuum advance diaphragm assembly, provided that the operating valve assembly is adapted to open and close a supplemental airstream to the nipple 48 of the impeller assembly body 32 in relation to the engine-created vacuum draw force.

It will therefore be readily understood by those persons skilled in the art that the present invention is susceptible of a broad utility and application. Many embodiments and adaptations of the present invention other than those herein described, as well as many variations, modification and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiment, adaptations, variations, modifications and equivalent arrangements, the present invention being limited only by the claim appended hereto and the equivalents thereof.

I claim:

1. In combination with an internal combustion engine defining at least one combustion chamber and adapted to combust a fuel and air mixture in the combustion chamber and to exhaust the products of the combustion therefrom to create a partial vacuum in the combustion chamber and draw a moving ambient airstream thereinto, the engine having means for atomizing liquid fuel and entraining the atomized fuel in the moving airstream, and means providing communication between the atomizing and entraining means and the combustion chamber for directing the fuel entrained airstream to the combustion chamber, an apparatus for improved fuel atomization comprising:

impeller means rotatably mounted intermediate said fuel atomizing and entraining means and said directing means for impingement thereagainst by the fuel entrained airstream for rotationally dispersing said fuel entrained airstream to break up and further atomize the liquid fuel therein;

means for admitting and directing a supplemental ambient airstream against said impeller means for imparting increased speed of rotation thereof; and diaphragm means for sensing the force of the vacuum draw exerted by the engine on said atomizing and entraining means and operably associated with said supplemental air means for maintaining said supplemental air means closed when the vacuum draw force of the engine is less than a preselected value and opening said supplemental air means when the vacuum draw force of the engine is greater than said preselected value;

wherein said fuel entrained airstream is conditioned in relation to the fuel requirements of the engine for substantially complete burning with minimal pollutants in the resultant products of combustion.

2. The combination of claim 1 and characterized further in that said impeller means includes a rotor member arranged with its rotational axis substantially parallel to the direction of movement of the fuel entrained airstream.

3. The combination of claim 1 and characterized further in that said impeller means includes a body having a throat area for passageway therethrough of the fuel entrained airstream, and a rotor member rotatably mounted in said throat area.

4. The combination of claim 3 and characterized further in that said rotor member is arranged with its rotational axis substantially parallel to the direction of movement of the fuel entrained airstream.

5. The combination of claim 3 and characterized further in that said body has an inlet passageway formed therethrough and opening into said throat area generally transversely to the rotational axis of said rotor member.

6. The combination of claim 5 and characterized further by conduit means communicating with said inlet passageway for delivering ambient air thereinto, said diaphragm means being operably connected to said conduit means for opening and closing thereof in relation to the vacuum draw force of the engine.

7. The combination of claim 6 and characterized further by means for cleaning airborne debris from said supplemental airstream.

8. The combination of claim 1 and characterized further in that said supplemental air means is arranged to direct said supplemental airstream against said impeller means transversely to its rotational axis.

9. The combination of claim 1 and characterized further by means for cleaning airborne debris from said supplemental airstream.

10. In combination with an internal combustion engine for an automobile or the like, the engine defining a plurality of combustion chambers and being adapted to combust a fuel and air mixture in the combustion chambers and to exhaust the products of combustion therefrom to create a partial vacuum in the combustion chambers and draw a moving ambient airstream thereinto, the engine having an air filter for removing airborne debris from the moving airstream a carburetor for aspirating liquid fuel in atomized particles and entraining the fuel particles in the moving airstream, and an intake manifold providing communication between the carburetor and the combustion chambers of the engine for directing the fuel entrained airstream to the combustion chambers, an apparatus for improved fuel atomization comprising:

an impeller assembly having a body mounted intermediate said carburetor and said intake manifold, a throat area through said body providing fluid communication between said carburetor and said intake manifold for passage through said throat area of the fuel entrained airstream, a rotor member rotatably mounted in said throat area for impingement against rotor member by the fuel entrained airstream for rotationally dispersing the fuel entrained airstream to break up and further atomize the fuel particles therein into relatively fine particles adapted for substantially complete combustion in the engine, and an inlet passageway formed through said body and opening into said throat area radially relative to the rotational axis of said rotor;

conduit means extending between the air filter and said inlet passageway of said impeller assembly for creating a supplemental moving airstream and directing said supplemental airstream into said inlet passageway for radial impingement against said rotor member for imparting increased speed of rotation thereof; and an E.G.R. diaphragm valve assembly having an inlet opening, an outlet opening and a vacuum sensitive diaphragm for opening and closing communication therebetween, said inlet and outlet openings being operably connected to said conduit means and said diaphragm being operatively connected with the carburetor for monitoring the force of the vaccum draw created by the engine on the carburetor, for closing communication between said inlet and outlet openings when the vacuum draw force of the engine is less than a preselected value and for opening communication between said inlet and outlet openings when the vaccum draw force of the engine is greater than said preselected value;

wherein said fuel entrained airstream is conditioned in relation to the fuel requirements of the engine for substantially complete burning with minimal pollutants in the resultant products of combustion.

11. The combination of claim 10 and characterized further in that said rotor member is arranged with its rotational axis substantially parallel to the direction of movement of the fuel entrained airstream.

12. The combination of claim 10 and characterized further in that said engine includes spark ignition distribution means for producing combustion ignition in the combustion chambers and vacuum advance means associated with said distribution means for sensing the vacuum draw force of the engine, said E.G.R. diaphragm assembly communicating with said vacuum advance means for correspondingly sensing the vacuum draw force of the engine.

* * * * *